(12) United States Patent
Hoeldrich et al.

(10) Patent No.: US 10,220,657 B2
(45) Date of Patent: *Mar. 5, 2019

(54) TIRE INFLATION CONTROL ARRANGEMENT

(71) Applicant: AGCO International GmbH, Hesston, KS (US)

(72) Inventors: Bernhard Hoeldrich, Ingenried (DE); Frank Kreulich, Marktoberdorf (DE); Christian Pischulti, Kaufbeuren (DE); Stefan Prestel, Buchenberg (DE); Alexander Staedele, Landsberg am Lech (DE); Benjamin Schmoelz, Marktoberdorf (DE)

(73) Assignee: AGCO Incorporated GmbH, Neuhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/469,120

(22) Filed: Mar. 24, 2017

(65) Prior Publication Data

US 2017/0246921 A1 Aug. 31, 2017

Related U.S. Application Data

(63) Continuation of application No. 14/915,495, filed on Feb. 29, 2016, now Pat. No. 9,701,164.

(51) Int. Cl.
*B60C 23/00* (2006.01)
*B60C 23/04* (2006.01)

(52) U.S. Cl.
CPC ........ *B60C 23/003* (2013.01); *B60C 23/0474* (2013.01)

(58) Field of Classification Search
CPC .................................................. B60W 23/003
See application file for complete search history.

(56) References Cited

U.S. PATENT DOCUMENTS

| | | | | |
|---|---|---|---|---|
| 4,640,331 A * | 2/1987 | Braun | ................... | B60C 23/003 137/224 |
| 5,313,995 A * | 5/1994 | Schultz | ................. | B60C 23/003 137/224 |
| 5,587,698 A * | 12/1996 | Genna | ................... | B60C 23/003 116/34 R |
| 5,629,874 A * | 5/1997 | Mittal | ................... | B60C 23/003 152/415 |
| 6,144,295 A * | 11/2000 | Adams | .................. | B60C 23/003 137/224 |
| 6,874,404 B1 * | 4/2005 | Elberson | ............... | B05B 7/2491 91/435 |

(Continued)

*Primary Examiner* — Alex C Dunn (57) ABSTRACT

A tire pressurization arrangement on a vehicle in which the pressurization of the tire is controlled by a vehicle control unit and the vehicle control unit is notified of a desired tire pressure or desired tire volume. An air flow rate in a supply line to the tire is established so that the time to pressurize the tire to the desired tire pressure/volume is calculable, or the time taken to pressurize the tire to an interval pressure/volume is calculable, said interval pressure/volume being between a current tire pressure/volume and the desired pressure/volume, and if the time to pressurize the tire to the desired pressure is exceeded, the control unit gives a warning signal and/or stops deflation or inflation.

16 Claims, 5 Drawing Sheets

(56) References Cited

U.S. PATENT DOCUMENTS

| | | | |
|---|---|---|---|
| 7,273,082 B2* | 9/2007 | White | B60C 23/003 |
| | | | 152/415 |
| 7,321,840 B2* | 1/2008 | Abramovitch | B60C 23/0408 |
| | | | 702/138 |
| 7,331,221 B2* | 2/2008 | Wise | B60S 5/046 |
| | | | 73/146.3 |
| 7,430,900 B2* | 10/2008 | Belanger | B60C 23/04 |
| | | | 340/442 |
| 7,437,920 B2* | 10/2008 | Beverly | B60C 23/002 |
| | | | 152/417 |
| 7,530,379 B1* | 5/2009 | Becker | B60C 23/003 |
| | | | 152/415 |
| 7,975,731 B2* | 7/2011 | Shultz | B60S 5/046 |
| | | | 141/38 |
| 8,757,232 B2* | 6/2014 | Weibezahn | B60C 23/006 |
| | | | 152/415 |
| 8,874,386 B2* | 10/2014 | Brusarosco | B60C 23/064 |
| | | | 701/1 |
| 8,973,633 B2* | 3/2015 | Wilson | B60C 23/003 |
| | | | 152/415 |
| 2009/0064789 A1* | 3/2009 | Silverbrook | G01L 9/0072 |
| | | | 73/708 |
| 2011/0175716 A1* | 7/2011 | Medley | B60C 23/002 |
| | | | 340/442 |
| 2012/0239336 A1* | 9/2012 | Delache | G01F 15/024 |
| | | | 702/100 |

* cited by examiner

TIRE INFLATION CONTROL ARRANGEMENT

CROSS REFERENCE TO RELATED APPLICATION

This application is a continuation application of U.S. application Ser. No. 14/915,495, filed Feb. 29, 2016, now U.S. Pat. No. 9,701,164, which claims the priority benefit of GB Application No. 1315426.5, filed Aug. 29, 2013.

BACKGROUND OF THE INVENTION

Field of Invention

This invention relates to a tire pressure control system (TPCS) having a rotatable air passage. In particular this invention relates to a tire pressure control system for measuring the tire pressure on an agricultural vehicle, or machine having a rotatable air passage.

Description of Related Art

In order to improve efficiency and safety on an agricultural machine or vehicle such as an agricultural tractor. it is necessary to change tire pressures depending on whether the tractor is operating in field conditions or on the road. When operating in the field lower tire pressures are required to reduce ground pressure and compaction and to improve the grip of the tires with the earth. For road work, higher tire pressures are required to reduce rolling resistance (which affects the economy of the tractor) and to reduce heat generation (which affects the safety of the tractor). So the tire pressure may vary between 0.6 bar and 2.5 bar.

Generally, every change of the tire pressure requires an interruption of the work operation and also requires further energy when the tire is inflated as the air must be supplied powering air compressors with about 10 kW. In terms of efficiency, it is a vital requirement to provide a TPCS process which is optimized regarding its time to function and its reliability.

Current systems suffer from the fact that the inflation process is not monitored during inflation and the process is only ended when the set value of the tire pressure is reached.

If the TPCS function is interfered by leakages in the system, it is more or less the operator's duty to interrupt the inflation based on his experience and his appraisal if an expected inflation time is exceeded. In this case the inflation process must be aborted due to failure/leakage. This may result in that the inflation process is aborted too early so that the target pressure value is not reached, or that the inflation process is aborted too late so that energy is wasted in supplying air to a leak or a defected valve.

So current TPCS systems require the drivers attention, concentration and experience to know when an expected inflation time is exceeded else the system is inefficient in that it may continue to supply air to a leak or defect in the system and not be noticed for a period of time.

OVERVIEW OF THE INVENTION

It is an object of the present invention to provide an alternative tire pressure control system in which the process of inflation is monitored automatically. Therefore, the time taken to inflate or deflate a tire on a vehicle to a desired pressure is determined. In this way the system can detect a leakage if the anticipated lime is exceeded. It is a further aim of the invention to provide a method of inflating or deflating a tire on a vehicle to a desired pressure.

According to the invention there is provided a tire pressurization arrangement on a vehicle in which the pressurization of the tire is controlled by a vehicle control unit and the vehicle control unit is notified of a desired tire pressure or desired tire volume, characterized in that an air flow rate in a supply line to the tire is established so that the time to pressurize the tire to the desired tire pressure/volume is calculable, or wherein the time taken to pressurize the tire to an interval pressure/volume is calculable, said interval pressure/volume being between a current tire pressure/volume and the desired pressure/volume. With this arrangement, a leakage or malfunction within the arrangement is easily identified if the anticipated time is exceeded.

Preferably, the air flow rate is calculated by taking the pressure differential between two points in the arrangement.

Preferably, the arrangement comprises a restriction and the pressure differential is measured across the restriction.

Preferably, the arrangement comprises two pressure sensors and the pressure differential is calculated between the two sensors.

Preferably, the arrangement comprises one pressure sensor and the pressure differential is calculated between the sensor 38 and atmospheric pressure.

Preferably, the control unit has access to tire dimensions of more than one size of tire.

Preferably, the arrangement comprises a control valve between the vehicle air supply and the tire.

Preferably, the tire arrangement comprises a first sensor and a second pressure sensor arranged on each side of the control valve.

More preferably, the first pressure sensor is positioned in the supply line between a front and a rear axle of the vehicle and the second pressure sensor is positioned in the supply line to a left and/or a right tire of the vehicle.

If the calculated time to pressurize the tire to the desired pressure is exceeded, a warning signal may be given. With this arrangement, the inflation process can be automatically aborted in case of a leakage without requiring the driver's attention, concentration or experience. This increases the driver's comfort and efficiency.

If the calculated time to pressurize the tire to the desired pressure is exceeded, the control unit may stop deflation or inflation.

Preferably, the control unit is calibrated to take into account the fluid parameters and/or geometry of components within the supply line in the arrangement during calculations.

According to a further aspect of the invention, there is provided a method of pressurizing a tire on a vehicle, said vehicle having a tire arrangement comprising an air passage which conducts air from an air supply to the tire, wherein the pressure differential between two points in the arrangement is measured so that the air flow rate is calculable and wherein when a specific tire pressure/volume is desired, the time taken to achieve the specific pressure/volume is calculated.

Preferably, the pressure differential is also used to calculate the time taken to achieve an interval tire pressure/volume, said interval tire pressure/volume being a value between a current tire pressure/volume value and the specific pressure/volume.

Generally, a tire inflation and deflation system comprises at least one rotatable air passage which is provided on, or within an axle to carry air to and from the tires. The rotatable passage may be connected to a further air duct for carrying air. The rotatable passage extends between rigid, stationary parts which are connected to the vehicle frame, or form a part of the frame, for example an axle housing and rotating parts, for example, the wheel hubs. Rotating parts such as wheel hubs are equipped with shaft seals which prevent oil from entering the air guiding area of the rotatable passage. Such systems are described in the Applicant's previous UK patent application Nos. GB1021928.5 and GB1021931.9.

Air seals are used to seal a rotatable passage with a contact component on the outside of the shaft. The rotatable passage is connected to air intake/outtake lines which are connected to an air source. To reduce the wear of the air seals, the sealing lips of the air seals only come into contact with the contact component when the rotatable air passage is charged with air during inflation or deflation. When the rotatable passage is not charged with air, the lips are lifted away from the contact component.

Problems arise in the rotatable passage if the air seals malfunction since air can then pass through the shaft seals and impair their function. A peak in air pressure may lift the shaft seals from their contact component so that air can pass into the axle housing. This results in a higher pressure level in oil guiding areas which may result in the following consequences:

Debris or dust may be brought in the oil guiding areas via leaked air

Seals or bearings may be damaged as lubricating oil is blown out resulting in higher wear Other seals installed in the vicinity of these oil guiding areas may be lifted and result in further oil leakage Damaged shaft seals result in oil entering the air guiding area and in combination with dust may led to blocked ducts and malfunction.

To overcome these problems, further passages or chambers may be provided as suggested in the Applicant's previous UK patent application Nos. GB 1021929.3, 881116851.5 and 881118156.7 in which chambers connected to the sealing means are connected to ambient pressure or a pressurization means to control the sealing contact of the sealing means with the contacting component. The chambers discharge any air that has leaked to avoid damage to the shaft seals. These applications are hereby incorporated by reference.

With the arrangements described above, the tire pressure is measured by a pressure meter. However, these arrangements do not offer a reliable solution as during inflation or deflation, the pressure level in the rotatable passage cannot be accurately measured by the pressure meter and the pressure is not always sufficiently high to ensure proper sealing contact. This results from the fact that the tire volume is relatively large on agricultural vehicles and machines compared to the volumes supplied by the air supply system so that air passes with high velocity but at a low pressure level, approximately 0.4 to 3 bar. Furthermore, the tire pressure is typically increased or decreased on an agricultural tractor, or agricultural machine as the vehicle or machine moves over different types of terrain in the fields or moves onto prepared road surfaces. The required range of tire pressures makes it difficult to set the air seals to operate at specific pressures. As a consequence, a good sealing contact cannot be guaranteed every time which results in the problems mentioned above.

U.S. Pat. No. 4,804,027 discloses the use of a check valve located in a passage on a non rotatable part between the hub and the axle housing so that the seals may be pressurized against the contact surface of the rotatable part until a pressure is met whereby the check valve then permits the flow of pressurized air into a passage in the rotatable part. The use of the check valve between the hub and axle housing requires complex structuring of vertical supports either side of each control valve in the passage of the rotatable part. Further the use of a check valve means the seals can only seal in one direction of air flow meaning the arrangement can only be used during inflation or deflation of the tire. Furthermore, to use the system, the arrangement must be initially de-pressurized.

BRIEF DESCRIPTION OF THE DRAWINGS

The invention will now be described, by way of example only, with reference to the drawings, FIGS. 1 to 5, in which.

DETAILED DESCRIPTION OF THE INVENTION

Figure 1:
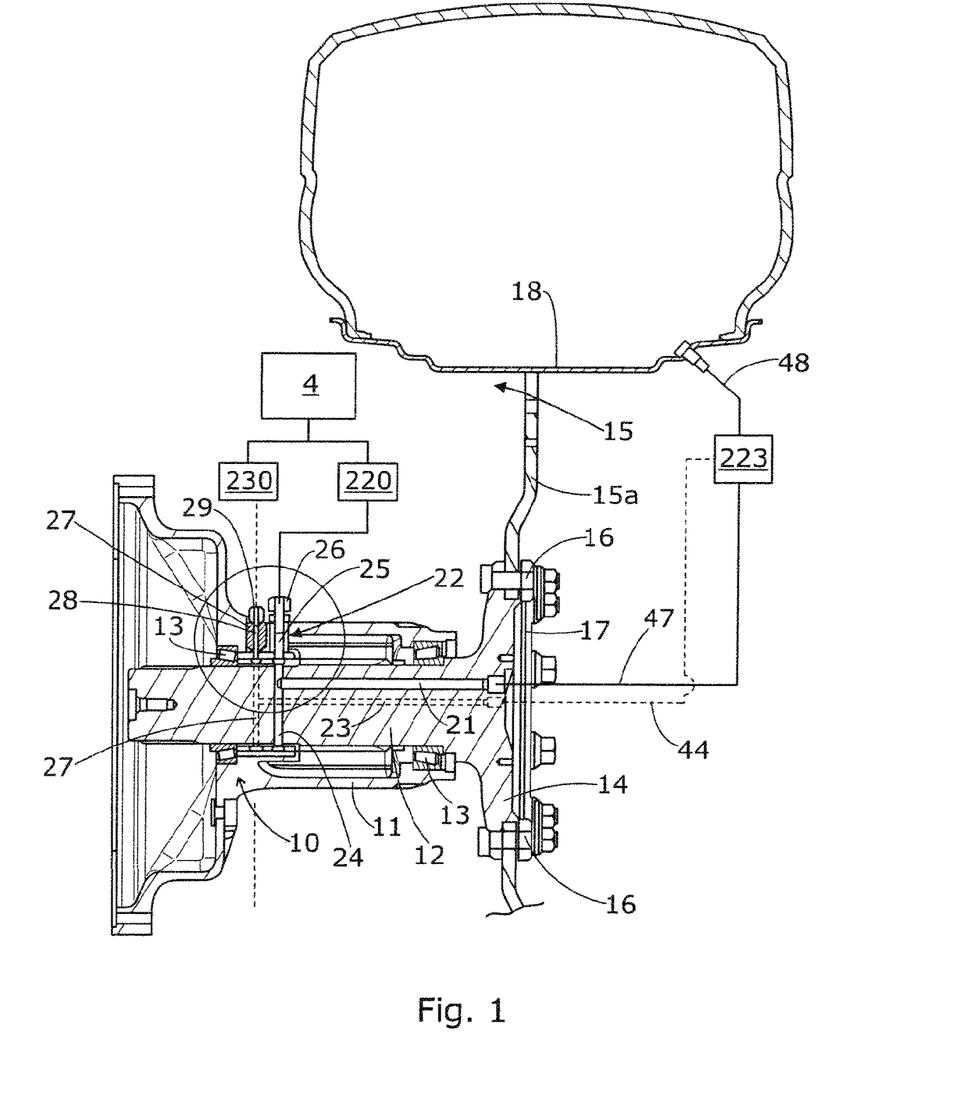
FIG. 1 is an axial sectional view through half of a tractor rear axle fitted with a tire inflation feed arrangement in accordance with the invention.
Figure 2:
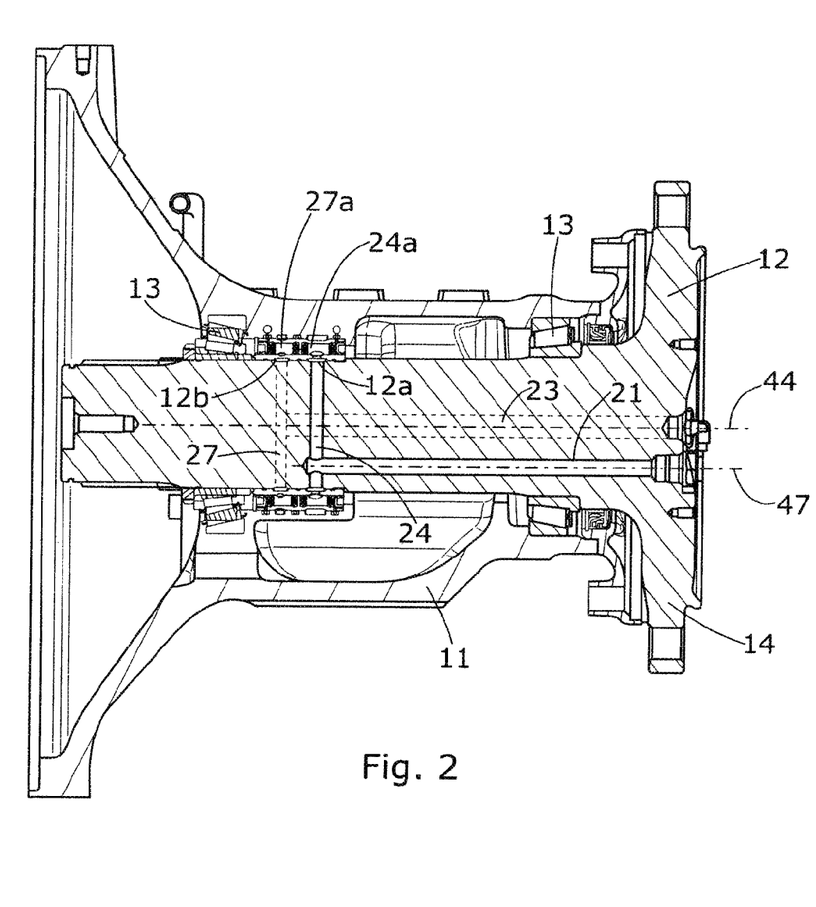
FIG. 2 is a section through the rear axle of FIG. 1 on a larger scale.
Figure 3:
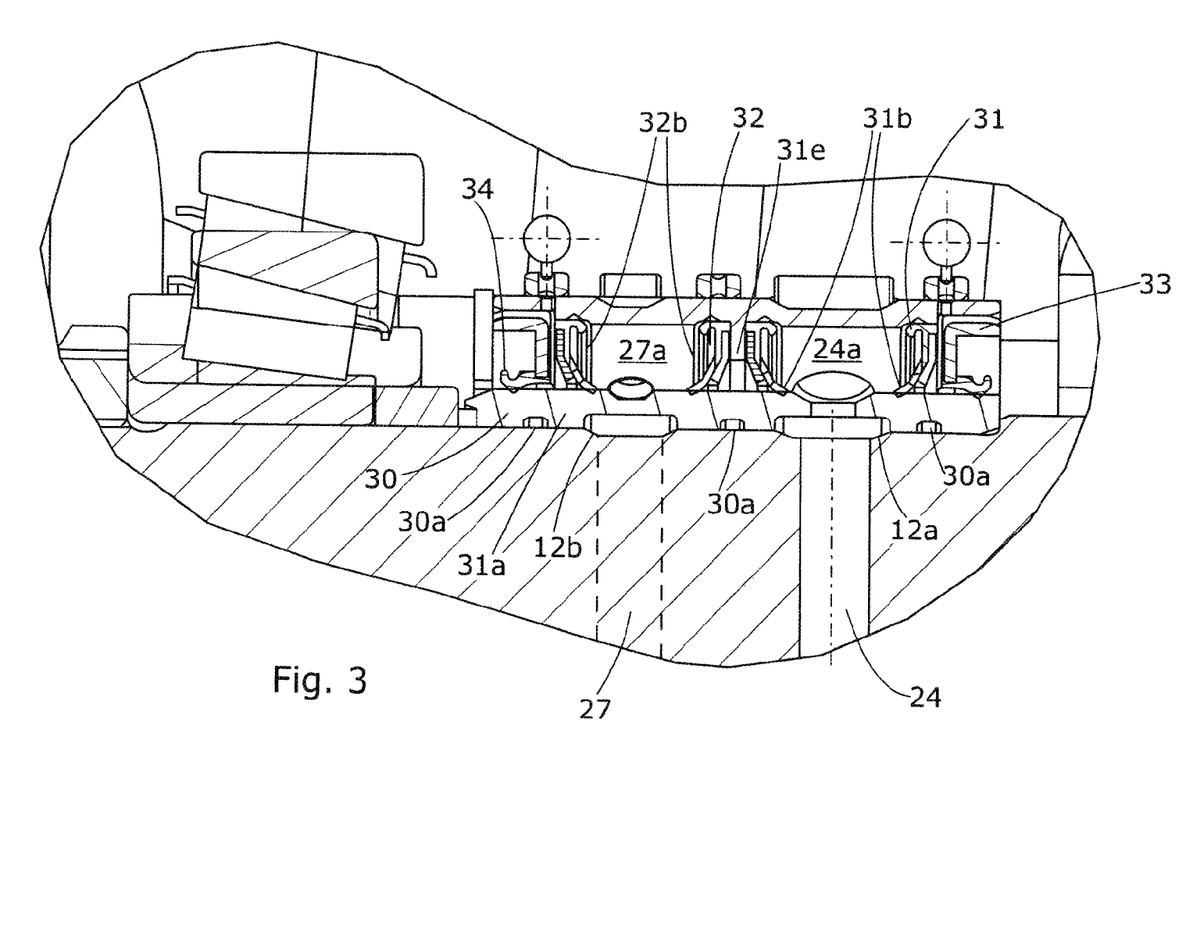
FIG. 3 is part of FIG. 2 on a larger scale.

Referring to FIGS. 1 to 3, a tractor rear axle 10, half of which is shown in cross-section in FIGS. 1 and 2, has an outer trumpet housing 11 within which a driveshaft 12 is supported by bearings 13. Driveshaft 12 terminates in a hub flange 14 to which a wheel disc 15a of a wheel 15 is clamped by bolts 16 and a clamping ring 17.

The wheel disc 15a carries a wheel rim 18 on which a pneumatic tire 19 is mounted. The present invention is concerned with a tire inflation system for conveying compressed air from the tractor air supply system 4 via air control valves mounted on the tractor to the rotating wheel 15 and hence via valve 223 mounted on the wheel to the interior of the tire 19 via lines 47 and 48. Air supply system 4 provides air to a control circuit 230 and supply circuit 220 which are explained in greater detail in FIGS. 4 and 5.

The tire inflation feed arrangement 22 which is shown in greater detail in FIG. 2 is provided with two rotatable air passages. One rotatable passage comprises a first passage 21 and a first radial feed passage 24. The other rotatable air passage comprises a second passage 23 and a second radial feed passage 27. Each rotatable air passage extends within the shaft 12 from hub 14 to a first and second annular axle zone 12a, 12b on the outer periphery of shaft 12 respectively. At the hub end of the shaft, outside of the hub, shaft and shaft housing, first passage 21 connects the rotatable air passage with air supply line 47. Second passage 23 is likewise connected to valve 223 by air supply line 44 outside of the hub, shaft and shaft housing. First radial feed passage 24 extends from first annular zone 12a to first passage. First and second radial feed passages 24, 27 are perpendicularly connected to respective first and second passages 21, 23 which extend inside the enclosed shaft to hub 14. In this way, both the rotatable air passages are fully enclosed within the rotatable shaft 12 and trumpet housing 11.

A contact component 30 surrounds annular zones 12a and 12b and is sealed to shaft 12 by seals 30a. Contact component 30 formed from, or coated with plastics material such as PTFE or could be made from stainless steel or could be hardened by nitrogen to resist wear. Radial passages 24 and 27 emerge through contact component 30 forming first feed through chamber 24*a* and second feed through chamber 27*a*. A holding element in the form of a surrounding casing 31*a* provided with sealing means 31, 32 is attached to the axle housing, or non rotatable part. The sealing means when in contact with the contact component 30 provides a through passage with the rotatable; air passage so that when the rotatable air passage is pressurized the through passage is also pressurized and ensures the integrity of the sealing means with the contact component 30. The seals come into contact with the contact means 30 on the axle shaft around annular zones 12*a*, 12*b*. Pipes 25 and 28 extend from the exterior of the axle housing, or non rotatable part of the vehicle through the axle housing to the casing 31*a*. They may be screwed to the casing 31*a*. With this arrangement there is a free, open passage from the surface of the axle housing, through pipes 25, 28, through the radial zones 12*a*, 12*b*, through the rotatable air passage to the hub 14. At the exterior of the axle housing pipes 25 and 28 are provided with pipe fittings 26, 29 which are connected by respective lines to supply circuit 220 and control circuit 230. Pipes 25, 28 may be made from stainless steel, or, brass, or some other non-corroding material. Pipes 25, 28 and pipe fittings 26, 29 and respective seals to provide air-tight connection are not shown in FIG. 3 for clarity reasons and as they are not: relevant for the invention.

Sealing means 31 is mounted in casing 31*a* into which pipe 25 is screwed. Sealing means 31 includes a pair of seals 31*b* on either side of first feed through chamber 24*a* which, when first feed through chamber 24*a* is pressurized are forced into sealing contact with the contact member 30 to seal the flow of air to passages 21,24. A shaft seal 33 is also provided in casing 31*a* to prevent the ingress of oil and dirt around axle 12.

Similarly, second sealing means 32 is also mounted in casing 31*a* into which pipe 28 is screwed. Sealing means 32 includes a pair of seals 32*b* are provided on either side of second feed through chamber 27*a* which, when second feed through chamber 27*a* is pressurized are forced into sealing contact with the contact component 30 to seal the flow of air to passage 23, 27 A shaft seal 34 is also provided in casing 31*a* to prevent the ingress of oil and dirt around axle 12.

The two sealing means 31 and 32 are located side by side with shaft seals 33 and 34 axially outermost relative to the two annular axle zones, 12*a* and 12*b*. A spacer 31*e* is built into casing 31*a* between the sealing means.

Use of a separate contact component 30 allows relatively easy replacement of the contact member if it becomes worn due to the contact pressure of sealing means 31 and 32 without the need for replacement of the expensive wheel flange 14 and associated shaft 12. Although in the embodiment described the seals 31 and 32 are carried by housing 11 and the contact member 30 is mounted on shaft 12, this arrangement could be reversed if desired. Furthermore, any other sealing means wherein the sealing contact is provided by pressurizing the respective passage can be used instead of the embodiment shown in FIGS. 1 to 3. Additionally, the radial passage as shown above could be replaced by an axial feed through arrangement as shown in Applicant's patent applications GB1016661.9 or 881016662.7.

Figure 4:
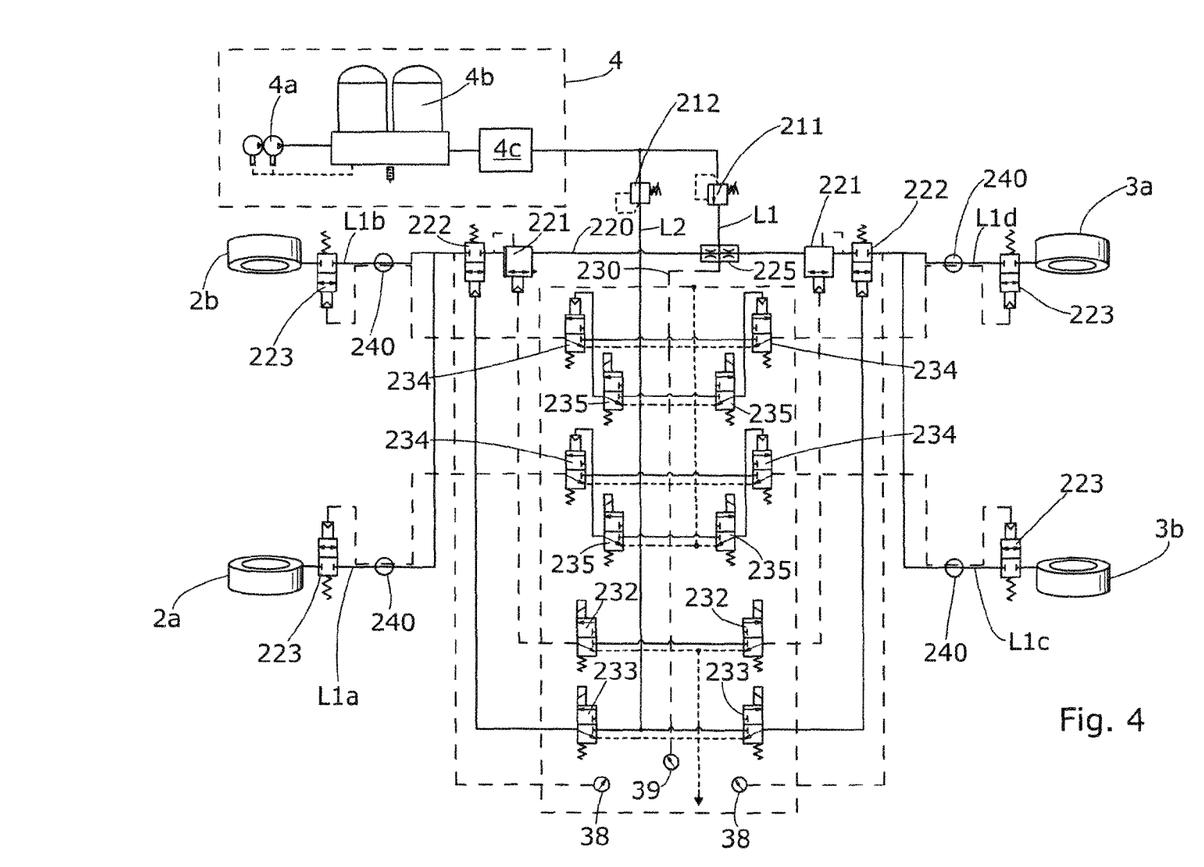
FIG. 4 shows a pneumatic circuit diagram of the tire pressure control system (TPCS) in accordance with the present invention.

Referring now to FIG. 4, which details the supply and control circuits 220 and 230 respectively on a tractor 1, the tractor 1 is provided with:

left and right front wheels 2*a*, 2*b*, left and right rear wheels 3*a*, 3*b*, and a tire pressure control system (TPCS) and a tractor air supply system 4 comprising a compressor 4*a*, air drier 4*b*, a protection valve means 4*c*.

The tractor air supply system 4 has a compressor 4*a* which supplies consumers via an air drier 4*b*. The air drier 4*b* includes a reservoir to store compressed air and a granule cartridge to extract water from the air. A pressure limiting valve restricts pressure levels to a maximum of approximately 8.5 bar. Typical consumers are for example, the tractor braking system, the trailer braking system or a front suspension (not shown) in which these consumers are primary consumers as their function is relevant: for safety. A secondary consumer is the TPCS. A protection valve means 4*c* balances the pressure required to be supplied to the primary set of consumers and will cut the supply to any consumer should a consumer develop a leak. In this way the integrity of the remaining primary consumers is maintained. Furthermore, protection valve means 4*c* ensures that supply to primary consumers is prioritized over the supply to secondary consumers, such as the TPCS.

The tractor air supply system 4 solely serves the purpose to supply air to the TPCS at a specific pressure level, for example 8, 5 bar and at a sufficient air flow to ensure acceptable inflation time during operation. The term air flow is taken to mean the volume of air per unit time. The tractor air supply system 4 could be replaced by any other air supply system, for example, a system such as that described in the Applicant's published patent application WO2011/001261, or EP 2 340 974 which serves the same purpose having an additional compressor parallel to an internal compressor.

The tractor air supply system 4 is connected to the TPCS via an excess flow valve 211 which is set to a minimum pressure level of for example, between 7.1 to 7.5 bar. If the pressure level in the line L1 drops below the set level, for example, if a break in the line occurs, the connection is blocked to protect the tractor air supply system 4 from complete air discharge.

A second connection between the air supply system 4 and TPCS is further provided via a pressure relief valve 212 which limits the pressure in line L2 to a level between 4.5 to 5 bar. The need for this second pressure level is explained later on.

Generally, the TPCS comprises two separate circuits which represent two functions of the system. One circuit is the supply circuit 220 which is depicted with continuous lines in FIGS. 4 and 5 and which provides an air supply to the tire. This circuit must be capable of high air flow rates at a maximum pressure level to ensure fast inflation of a tire.

Figure 5:
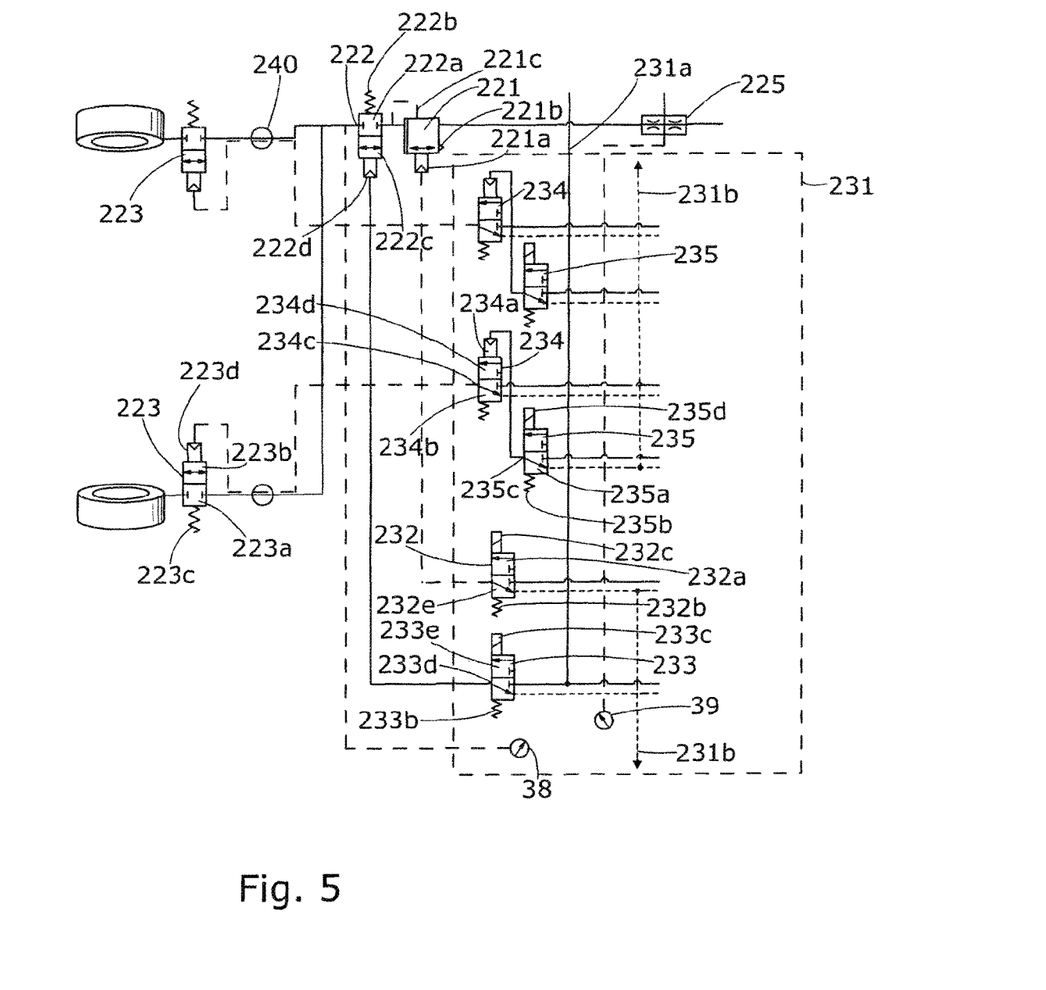
FIG. 5 shows the pneumatic circuit diagram of FIG. 4 in further detail.

A second circuit, control circuit 230 as shown with the broken line is provided for activating the deflation and inflation process by components of the supply circuit 220 controlled by pilot valves. Compared to the supply circuit 220, the pressure level is reduced by pressure relieve valve 212. In addition, all components of the control circuit are specified for smaller air flow as the pilot function requires only small air flows. The lower pressure level and air flow in control circuit 230 enables the use of smaller and cheaper components, especially valves, which improves procurement, costs and installation space. Furthermore, the lower pressure level enables higher accuracy when sensors are installed, as the accuracy is decreased with a greater range of operation.

The TPCS is similar for the front and rear axle (and mostly the same for each tire).

FIG. 5 shows FIG. 4 in greater detail in which the components related to rear wheels 3*a*, 3*b* and to the tractor air supply system 4 have been omitted.

The supply circuit 220 is provided with two main control valves 221 (one assigned to front tires 2a, 2b and the other assigned to rear tires 3a, 3b) to regulate the pressures in the tires. The main control valves 221 have two different: operating conditions and may be controlled pneumatically, or electronically. In a first condition, the supply lines (that is the air supply lines connected to line L1) are connected (for inflation) and a second condition in which the supply lines are connected to ambient atmosphere (for deflation). Tire supply lines L1a, L1b, L1c and L1d, connect the first stop valves 22 to each tire. Each of the first stop valves 222 is connectable to supply line L1 for inflation and to the atmosphere for deflation.

First stop valves 222 are biased by a spring means 222b and can be moved into a position 222a to close the valve (as shown in FIG. 5) and block air flow, or can be moved to an open position 222c to allow air flow. The valves 222 may be moved into the open position 222c against the force of spring 222b pneumatically by charging port 222d. After each of first stop valves 222, the supply lines branch off to the respective tires 2a, 2b and 3a, 3b. In each branch air will pass through first radial feed passage 24 and passage 21 (being part of the rotatable passage 240) for inflating and deflating a tire as shown in FIGS. 1 and 2.

Second stop valves 223 are provided which can also be controlled pneumatically and can be moved into two positions, open and closed. A closed position 223a is shown in FIGS. 4 and 5 in which it is biased by spring 223c to block the air flow to and from the tire. By charging port 223d, the valve can be moved against the spring 223c into an open position 223b to connect the interior of the tires 2a, 2b, 3a, 3b to the supply line.

As described above, the valves 221, 222 and 223 are controlled pneumatically. The control function is provided by control circuit 230. All means for controlling the valves are integrated in a pilot valve manifold 231 as shown by the dotted lines. Pilot valve manifold 231 is connected via port 231a to pressure relief valve 212 to receive air at a reduced pressure level of between 4.5 to 5 bar. Ports 231b enable the discharge of air to the atmosphere. Each valve installed within pilot valve manifold 231 is connected to the respective ports to supply air or to discharge air to the atmosphere. Pilot valve manifold 231 is also connected to the tractor control unit (not shown) to control the TPCS.

Main control valves 221 are pilot controlled by first pilot control valves 232 which are designed as a three port/two way valve. Valves 232 move into position 232a against spring 232b when solenoid 232c is activated. When port 232d is charged with air, port 221a is also charged with air so that main control valve 221 is opened. The valve is biased in the second position 232e shown in the figures by spring 232b wherein port 232d is connected to the atmosphere so that main control valve 221 is moved to a position in which port 221b is connected with the atmosphere (for deflation).

In a mid position, main control valve 221 blocks the connection. The mid position is provided if the pressure charged via line 221c is balanced with the pressure charged via port 221. Due to the simple and cheap design of the valve, this mid position cannot be adjusted permanently, so that valve 221 cannot be provided for controlled blocking of the connection.

Stop valves 222 are pilot controlled by second pilot control valve 233. Depending on its position, the stop valves 222 are opened or closed. The position 233a of second pilot control valve 233 shown in FIGS. 4 and 5 is biased by spring 233b. If solenoid 233c is activated, port 233d and thereby port 222d is charged with air so that stop valves 222 are opened to position 222c. In the second position 233e, port 233d and thereby port 222d is connected to the atmosphere and stop valves 222 are moved into position 222a by spring 222b so that air flow through stop valves 222 is blocked.

As second stop valves 223 are installed on the tires, the connecting pipes to the pilot valve manifold 231 are much longer compared to tile connection of main control valves 221 and first stop valves 222. The overall resistance due to the rotatable passages and longer lines are larger. This results in that further third pilot control valves 234 are provided which have a larger air flow capacity. This greater air flow increases the pressure peak through the rotatable passage as the second stop valve blocks the air flow (when in position 223a) so that the back pressure increases the pressure level in the rotatable feed through. As valves with the demanded larger air flow capacity are not available with solenoid control or are very expensive and spacious, third pilot control valves 234 are also pneumatically pilot controlled and connected to a fourth pilot control valve 235 which is similar (referring to air flow capacity) to first pilot control valve 232 and second pilot control valve 233. Fourth pilot control valves 235 is again solenoid-controlled. Thereby third pilot control valves 234 and fourth pilot control valves 235 provide a two-stage pilot control for second stop valves 223 working as following:

Fourth pilot control valves 235 is kept in position 235a by spring 235b so that port 235c is connected to ambient. As port 235c is connected to port 234a, third pilot control valves 234 is kept in position 234b. In this position, port 234c is connected to ambient so that second stop valves 223 remain in blocked position 223a. If solenoid 235d moves fourth pilot control valves 235 in position 235e, port 234a is charged with air moving third pilot control valves 234 into open position 234d. In this position, port 234c is connected to air source so that second stop valves 223 is moved to open position 223b. Third pilot control valves 234 and fourth pilot control valves 235 are provided for each tire.

The details related to the pilot control within the pilot valve manifold 231 in general are not relevant for the invention and may be designed in various layouts. Solenoid-controlled valves replacing valves 221, 222 and 223 may obviate the need of any pilot control.

In addition, pilot valve manifold 231 comprise s two pressure sensors 38, 39, whereby first pressure sensors 38 are connected in the line after first stop valves 222 and second stop valves 223. Second pressure sensor 39 is connected in the line before first stop valves 222 and main control valves 221 of each axle. The function of both sensors is explained later on.

During operation of the tractor and when the TPCS is in stand-by mode, second stop valves 223 are in closed position 223a to close the tire volume.

The term operation of the vehicle or machine is defined herein as meaning that the vehicle or machine is in a condition that its system or systems are sufficiently powered to for operation e.g. with the engine running. The term shut down of the vehicle is defined herein as meaning that the vehicle or machine is in a condition that its system or systems are not sufficiently powered for operation e.g. with ignition key is removed and the driver leaves the vehicle.

Referring to TPCS the term stand-by mode is defined herein as meaning that the TPCS is in a condition wherein no change in tire pressure is done by the driver or an automatic control system but measurements or monitoring functions may still function. The TPCS Active mode is characterized by any change in tire pressure.

If the vehicle is not in operation (shut down), TPCS is also out of operation as supply of any electric or pneumatic energy supply is cut. Consequently, in this condition the TPCS is not in stand-by, nor in Active mode.

If the tire pressure is adjusted (by manual input by the driver or an automatic control system), second stop valves 223 (for the respective tires) are opened.

If the tires are inflated (tire pressure is increased), main control valves 221 are adjusted so that tire is connected to the tractor air supply system 4 and the tire is charged with air.

Depending on the design, the pressure adjustment may be done in two ways. Firstly main control valves 221 are fully opened until the tire pressure, monitored by first pressure sensor 38, reaches the demanded value. Alternatively, main control valves 221 may be opened to a position corresponding to the required pressure. The tire pressure is fed back via line 221c and closes when the value is reached. In case of deflation, main control valves 221 are moved into a position in which port 221b is connected with the atmosphere. Air can be discharged to the atmosphere until the demanded pressure value, monitored by first pressure sensor 38, is reached.

Furthermore, the feedback via line 221c ensures that the pressure level in the supply circuit after the main control valve 221 does not exceed 4.5 to 5 bar as the pressure in line 221c counteracts against the pressure coming from pilot circuit via port 221a which is set to a maximum of 4.5 to 5. This balancing ensures that the tires are not charged with more than 5 bar representing an acceptable level.

So the supply circuit 220 of the TPCS is provided with two different pressure levels: In between supply system 4 and main control valve 221, the pressure level, hereinafter referred to as tractor supply pressure, can reach up to 8.5 bar while in between main control valve 221 and tire 2a, 2b, 3a, 3c, the pressure level is limited to 5 bar hereinafter referred as TPCS supply pressure.

At the end of any inflation or deflation process, second stop valves 223 are moved to a closed position 223a.

Tire supply lines L1a and L1b are supply lines respectively for the two tires 2a, 2b on the front axle and are connected to pressure sensor 38. Tire supply lines L1d and L1c which are supply lines for tires 3a, 3b respectively on the rear axle and are connected to another pressure sensor 38.

Each supply line L1a, L1b, L1c and L1d is therefore the pneumatic connection between the respective valve 223 on each tire 2a, 2b, 3a, 3c and the second valve means 222. Supply line L1a is permanently connected with supply line L1b and supply line L1c is permanently connected with supply line L1d.

To measure the current tire pressure $P_c$ of tire 2a, the second stop valve 223 associated with tire 2b is closed and the second stop valve 223 associated with tire 2a is opened so that air from tire 2a flows from the tire along supply line L1a to first stop valve 222. If the opening and closing of the second stop valve 223 is controlled by a tractor control unit, the second stop valve 223 can be opened automatically for a defined period of time before closing to achieve a static pressure in the respective supply line. The pressure in the supply line between the tire and the first stop control valve 222 can be measured by pressure sensor 38 which represents the pressure in the tire.

In accordance with the invention there is a restricted piece of supply line, or restriction 225 between stop valves 222 in the air supply system 4. The restriction 225 is also connected by line L1 to valve 211. The restriction is used to determine the pressure differential. The pressure sensor 38 thereby provides the pressure in the supply line between the restriction 225 and main control valve 221 while a second pressure sensor 39 measures the pressure of the other side of the restriction 225. Both sensors are used to calculate the pressure differential Δp across the restriction 225. Sensors 38, 39 measure the dynamic pressure within the arrangement.

Main control valve 221 and stop valve 222 are fully opened during inflation and pressure measurements taken by sensors 38, 39 are not influenced as the pneumatic resistance is known and is approximately constant. Using a separate restriction 225 has the major advantage that the pressure differential is increased which, increases the accuracy of the measurement.

By calculating the pressure differential Δ p, the air flow rate Q of the air being supplied to the tire can be calculated. By air flow rate Q, it is meant the volume of air passing a given point per unit time. The relation of pressure differential, Δp and air flow rate, Q across a restriction depends on various parameters including "fluid viscosity, fluid compressibility and the geometry of the restriction. The theoretical basis of the relationship between pressure differential. Δp and air flow rate, Q are described in various publications and considered to be general engineering knowledge so that further detailed explanation is not necessary.

For the embodiment described herein, the parameters can be summarized in a constant, C since the geometry of the restriction is known and remains constant and the fluid parameters mentioned above do not vary significantly within the operational range of the TPCS. This results in a simplified equation:

$$Q = C \times \sqrt{\Delta p}$$

If C cannot be considered to be constant, the relation between air flow rate, Q and pressure differential Δ p could also be taken from tire characteristic maps stored in the tractor control unit or TPCS control unit.

The tire pressure difference, $\Delta p_T$ which the tire has to be increased by to achieve the desired pressure, $P_d$ is calculated by subtraction of the desired tire pressure, $P_d$ from the current tire pressure, $P_c$. For a tire with known dimensions, a relationship between the tire pressure difference $\Delta p_T$ and the necessary increase in tire air volume ΔV can be derived in order calculate the volume of air needed to be supplied to achieve the desired tire pressure, $P_d$. This relationship is considered to be general engineering knowledge that the skilled person would know so that further detailed explanation is not necessary.

A characteristic map is stored in the tractor control unit or TPCS control unit which provides the relationship between the tire pressure difference, $\Delta p_T$ and tire air volume increase, ΔV across the operational range of the TPCS.

The method used to calculate the time required, t to inflate a tire to a desired pressure is as follows:
1) The tractor control unit or driver recognizes the need for pressure adjustment of one of the tires and the desired pressure $P_d$ is entered or selected.
2) The tractor control unit determines the difference in tire pressure $\Delta p_T$ between the current tire pressure, $P_c$ and the desired tire pressure $P_d$ using the formula $$\Delta p_T = P_d - P_c$$

3) The tractor control unit or TPCS control unit consults a characteristic maps assigned to the mounted tire comprising its tire dimensions and determines the air volume increase, $\Delta V$ needed to effect the tire pressure difference, $\Delta p_T$.

4) The control system starts the inflation process by opening the connection of the respective tire to the supply system as described hereinafter.
5) The air flow rate, Q is determined by measuring the pressure differential, $\Delta p$ across the restriction 225 between sensors 38 and 39.
6) Knowing the air flow rate, Q the required volume increase, $\Delta V$ can be determined and correlated with an achieved tire pressure increase $\Delta p_{Tn}$, for any period of time. Alternatively, knowing the air flow rate, Q and the volume air increase, $\Delta V$ the time taken, to achieve the volume increase can be calculated. Even if the flow rate is not constant (for example, if the air supply is not constant because the engine speed is changed, or demand of other consumers is prioritized) the system can calculate a current volume increase at any time, $\Delta V_n$ by summing up previous time periods with measured air flow.
7) This may be the last step, if the next step, step 8 is not utilized. One or more interval measurements is made during inflation utilizing two different interval measurement methods A, B (described in detail below). Methods A and B may be used concurrently. Method A calculates a time for an interval pressure measurement to be made (that is a chosen pressure between a current pressure and the desired pressure). The method compares the calculated pressure value with the measured pressure value at the calculated time interval. Method B calculates the pressure value for a pre-determined time interval. The method compares the calculated pressure value with the measured pressure value a, the pre-determined time interval.
8) If step 7 is not utilized time, t is calculated for the total time taken to inflate the tire to the desired pressure $P_d$.

A) Measurement in Half Step/Decreasing Intervals

The system determines the overall pressure difference $\Delta p_T$ and sets the first measurement M1 when half the pressure increase $\Delta p_{T1}$ should have been achieved. As the system knows air flow rate, Q at any time the air volume increase $\Delta V_1$ assigned to $\Delta p_{T1}$ can be determined so that at time, $t_1$ pressure measurement M1 is taken. If the measured pressure, or measured pressure difference $\Delta p_{T1}$ exceeds a defined tolerance field of for example ±0.1 bar compared to the calculated values, the system aborts inflation and may generate a warning.

If the measurement M1 was within the tolerance band, the time $t_2$ for taking a second measurement, M2 is determined by taking the remaining pressure increase (now reduced as an increase $\Delta p_{T1}$ has already been provided) and halving this pressure ($\Delta P_{T2}$), to calculate the time $t_2$ for measurement M2. Again, the pressure is checked as described with measurement M1. Similarly, further measurements M3, M4, . . . Mn, with respective $t_3$, $t_4$ . . . $t_n$ or $\Delta p_{T3}$, $\Delta p_{T4}$ . . . $\Delta p_{Tn}$ can be calculated and compared. Due to the tolerance field, the half step measurement will not be necessary when half of the remaining pressure increase ($\Delta p_{Tn}$) is less than 0.1 bar.

B) Measurement with Constant Interval

An interval measurement method. B with constant intervals may also be used in addition, or as an alternative to method A. Depending on the overall inflation time, t, a measurement of the tire pressure during inflation at a fixed interval of, for example 60 seconds is now described. (The length of the interval may depend on the overall inflation time, so that the interval is shorter if the overall inflation time is shorter). The system is programmed to provide a measurement every 60 second (or at any other pre-determined time interval).

For example, if the half step measurement method, A determines a first half step measurement M1 after 200 seconds, method B will measure after 60 seconds. The half step method, A calculates the time to make the next measurement, M2, whereas method B makes another measurement after a further 60 second period in accordance with the pre-determined interval measurement. The third measurement point M3 for method A may then fall within 50 seconds. As this time is shorter than the defined interval under method B there is no need for a further interval measurement under method B. Under half step method, A the following measurement point M4 should be shorter (if the air flow does not decrease) so there is no further interval measurement under method B. If the air flow decreases greatly, a further measurement, $M_n$ may exceed 60 seconds so that a further interval measurement under method may be made again.

The advantage of the combination of half step measurement according to method A and interval measurement according to method B is that on the one hand the half step measurement provides a procedure with reduced measurements while the interval measurement increases operational safety. By overlapping both methods, a good compromise between measurement, duration and reliability is achieved.

Step 7 of the method to calculate the time for inflation to the desired pressure provides a very safe and reliable monitoring method during inflation and has the advantage that a failure or leakage can be detected early on in the inflation process.

Furthermore step 7 may be omitted to save time. In such a case Step 7 may then be replaced by a subsequent measurement after inflation is complete, as indicated with Step 8 to compare the final tire pressure with the desired pressure $P_d$. If the desired pressure $P_d$ is reached, the inflation process is finished. A message may be generated to this effect for the operators knowledge. If the desired pressure $P_d$ is not reached, the process is aborted and a failure message generated.

In case of that the desired pressure $P_d$ is not reached, an alternative approach may be to evaluate if the difference between the measured tire pressure and the desired pressure $P_d$ is so small that a leak is not likely. This small deviation may initiate step 1 again as previously described. This repetition may result in the desired pressure $P_d$ being finally reached.

Given the relationship between pressure and volume, the invention could be realized by using volumes calculated from the pressure measurements and pressure calculations made.

The choice of measurement during inflation depends on how reliable the system is, and may rely on how high the manufacturer assesses the probability of failure of the system to be.

The method described herein provides an automatic monitoring of the inflation process avoiding wasteful TPCS operation in the case of a malfunction/leakage within the inflation arrangement. Thereby the system can be adapted for different reliability specifications.

Based on the measurement during inflation, the control unit can actively adapt characteristic maps or parameters involved in the calculation to provide a more automated system. Alternatively, the driver may be asked to confirm which tires are mounted on the vehicle before characteristic maps are used to avoid calculations being based on the wrong tire type and dimensions.

The position of the sensor 39 in between the junction of the front and rear axle reduces the numbers of the sensors needed to being just one for at least two tires. Nevertheless, the two sensors with a restriction could be installed at any point within the supply circuit without leaving the scope of the invention. Using a separate restriction 225 increases the pressure differential which, in consequence, increases the accuracy. The restriction may be omitted by using parts of the supply line as a restriction itself.

In the shown embodiment the pressure differential is determined by two sensors providing a pressure differential. Alternatively the air flow rated, Q could be determined by using any other means, such as impeller flow meters.

In the described embodiments, some values are calculated by equations while others are determined by using characteristic maps. It is envisaged that any combination of use of equations or characteristic maps be used without leaving the scope of the invention.

During inflation or deflation the rotatable air passage and through passage are charged with a high air flow, but a low pressure level. This is caused by the fact that the maximum tire pressure of a standard tractor tire is about 2 to 3 bar while the air supply would be able to provide 4.5 bar. As a consequence, the seals are pressed into sealing contact by a low pressure level. Furthermore, this pressure level can vary depending on the tire pressure target value or the required air flow (which can be very low under certain conditions, e.g. if only a small pressure difference is necessary) so that it is rather impossible to design a seal which is pressed into sufficient contact without excessive wear for every operating condition. This negatively impacts the function of the seals in the rotatable passage 240.

To ensure a suitable pressure level in the rotatable passage before inflation or deflation of tires, the pressure level in the rotatable passage is raised by the following method:
1. Tractor control unit recognizes the need of pressure adjustment and the process is initiated.
2. Second stop valves 223 are kept in closed position 223a.
3. Main control valves 221 are adjusted so that tire is connected to the tractor air supply system 4 and the pressure level within the rotatable passage 240 (respectively chamber first feed through chamber 24a) is raised. This step may be time controlled (by assuming that after a pre-determined time, the desired pressure level is reached), or by using pressure sensors 38. Pressurization continues either until the pre-determined time is reached, or the desired pressure level is reached. At this stage sealing means 31, 32 are firmly pressed against contact component 30 providing a good seal between the rotatable and non rotatable parts. This step is provided both for inflation and deflation of the tires.

If the pressure level in the rotatable passage 21 is within the defined pressure range, second stop valves 223 are then moved to the open position 223b.

Main control valve 221 is then adjusted to obtain the desired tire pressure as described above.

The blockage of stop valve 223 prior to any adjustment ensures a high pressure level in the seals and therefore a proper sealing contact. After opening stop valve 223 for starting the inflation or deflation, the pressure level may fall but the sealing contact is still sufficient due to the preceding blockage.

The method can be used prior to both inflation and deflation of the tire without changing any structural components, or steps of the method.

For the rotatable passage of the supply line, this function is not required as although third pilot control valve 234 provides a high volume in line 44 which is used to move stop valves 223 to position 223b resulting in that the air flow is initially blocked in line 44 so that the pressure level in rotatable passage increases rapidly.

Both methods ensure that the rotatable passage and through passage between sealing means 31, 32 is pressurized which therefore ensures the integrity of the seal means 31, 32 with the contact component 30. This thus provides a good seal between the rotatable and non rotatable parts of the arrangement before the pressure in the tire is adjusted.

When pressure sensors 38 are provided, the deflation or inflation process is only activated when the pressure in the rotatable passage 21 is within the defined pressure range. If the pressure level is not maintained, the system may generate a warning for the driver. This ensures that that malfunction is detected which increases functional safety and efficiency.

In a further embodiment, the stop valves 223 are replaced by lockable check valves. These lockable check valves are known in prior art and work as explained below.

The check valve is spring biased and connected to the control circuit 230 for pilot control. For better understanding, the design of these check valves is briefly explained:

Generally the valve comprises a piston-like closure member in form of a cone or ball which is biased by a spring. The piston is moved directly by the supply circuit 220. A further piston (in line with first piston-like closure member) is charged by control circuit 230 (also called pilot control). This additional piston acts on the closure member and is mainly provided to offer a ratio (to enable low pilot pressure) or to avoid any influence from either circuits.

The check valve normally blocks the flow of air from the tire 2a, 2b, 3a, 3b back to the supply circuit 220 to prevent any unmeant deflation. During inflation, the supply circuit 220 provides a higher pressure (compared to the tire) so that the check valve is opened against spring tension. The tire can be charged with air to reach the desired tire pressure. For deflation, the control circuit 230 pneumatically opens the check valve against spring tension so that air can be discharged from the tire. In this case the spring is designed to be opened solely by the pressure in the supply circuit 220.

According to the present invention, the design of the known check valves is changed in the following manner. The spring is designed so that the check valve cannot be opened by pressure supplied in the supply circuit 220 but only by a pre-determined pressure in the control circuit 230. Referring to the design, the effective surface of the pistons is specified so that the size on the supply circuit is small compared to the size on the control circuit and so that the check valve can only be opened (in one direction) by a pre-determined pressure by the control circuit 230 but not by the operating pressure in the supply circuit 240.

In the shown embodiment, the invention is realized by installing main control valves 221 and second stop valves 222 in line due to reasons described above. It is envisaged that the functions of both valves 221, 222 could be combined into one valve, either 221 or 222.

The invention claimed is:

1. A tire pressurization system on a vehicle comprising a vehicle control unit and at least one pressure sensor, in which the pressurization of a tire is controlled by the vehicle control unit and the vehicle control unit is notified of a desired tire pressure or desired tire volume, wherein an air flow rate in a supply line to the tire is established using the at least one pressure sensor so that the time to pressurize the tire to the desired tire pressure or volume is calculated from the air flow rate, or wherein the time taken to pressurize the tire to an interval pressure or volume is calculated, said interval pressure or volume being between a current tire pressure or volume and the desired pressure or volume and wherein if the calculated time to pressurize the tire to the desired pressure or volume is exceeded, a warning signal is given.

2. The tire pressurization system as claimed in claim 1 wherein the air flow rate is calculated by taking the pressure differential between two points in the system.

3. The tire pressurization system as claimed in claim 2 comprising a restriction and the pressure differential is measured across the restriction.

4. The tire pressurization system as claimed in claim 2 wherein the at least one pressure sensor comprises first and second pressure sensors and the pressure differential is calculated between the first and second sensors.

5. The tire pressurization system as claimed in claim 4 wherein the first pressure sensor is positioned in the supply line between a front and a rear axle of the vehicle and the second pressure sensor is positioned in the supply line to a left and/or a right tire of the vehicle.

6. The tire pressurization system as claimed in claim 2 wherein the pressure differential is calculated between the at least one pressure sensor and the ambient pressure.

7. The tire pressurization system as claimed in claim 1 wherein the control unit has access to tire dimensions of more than one size of tire.

8. The tire pressurization system as claimed in claim 1 wherein the control unit is calibrated to take into account the fluid parameters and/or geometry of components within the supply line during calculations.

9. A tire pressurization system on a vehicle comprising a vehicle control unit and at least one pressure sensor, in which the pressurization of a tire is controlled by the vehicle control unit and the vehicle control unit is notified of a desired tire pressure or desired tire volume, wherein an air flow rate in a supply line to the tire is established using the at least one pressure sensor so that the time to pressurize the tire to the desired tire pressure or volume is calculated from the air flow rate, or wherein the time taken to pressurize the tire to an interval pressure or volume is calculated, said interval pressure or volume being between a current tire pressure or volume and the desired pressure or volume, wherein if the calculated time to pressurize the tire to the desired pressure or volume is exceeded, the control unit stops deflation or inflation.

10. The tire pressurization system as claimed in claim 9 wherein the air flow rate is calculated by taking the pressure differential between two points in the system.

11. The tire pressurization system as claimed in claim 10 comprising a restriction and the pressure differential is measured across the restriction.

12. The tire pressurization system as claimed in claim 10 wherein the at least one pressure sensor comprises first and second pressure sensors and the pressure differential is calculated between the first and second sensors.

13. The tire pressurization system as claimed in claim 12 wherein the first pressure sensor is positioned in the supply line between a front and a rear axle of the vehicle and the second pressure sensor is positioned in the supply line to a left and/or a right tire of the vehicle.

14. The tire pressurization system as claimed in claim 10 wherein the pressure differential is calculated between the at least one pressure sensor and the ambient pressure.

15. The tire pressurization system as claimed in claim 9 wherein the control unit has access to tire dimensions of more than one size of tire.

16. The tire pressurization system as claimed in claim 9 wherein the control unit is calibrated to take into account the fluid parameters and/or geometry of components within the supply line during calculations.

* * * * *